March 31, 1970 W. J. KUDLATY 3,503,509
FILTERING ASSEMBLY
Filed May 29, 1968
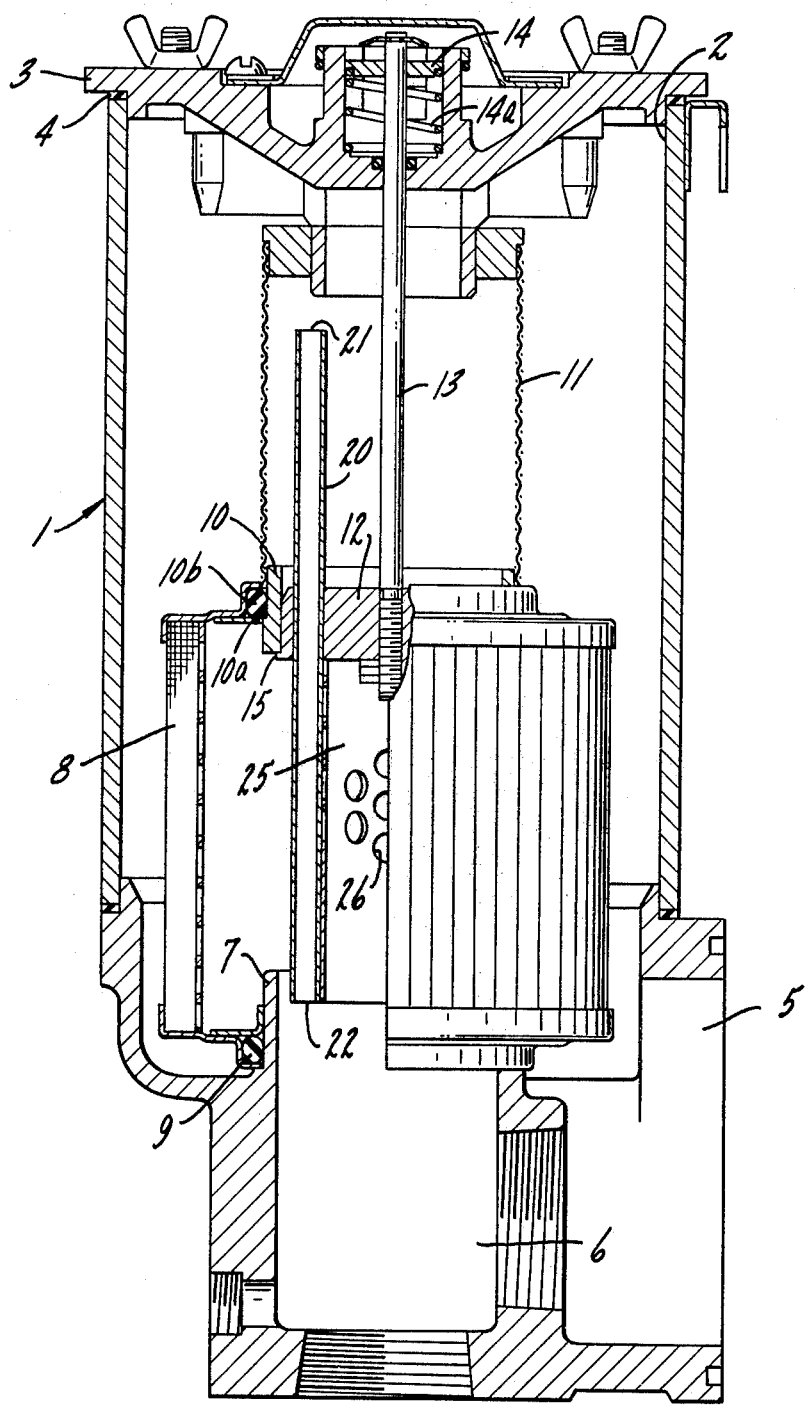
INVENTOR.
Walter J. Kudlaty
BY Parker & Carter
Attorneys.

United States Patent Office 3,503,509
Patented Mar. 31, 1970

3,503,509
FILTERING ASSEMBLY
Walter J. Kudlaty, Elmhurst, Ill., assignor to Marvel Engineering Company, Chicago, Ill., a corporation of Delaware
Filed May 29, 1968, Ser. No. 733,034
Int. Cl. B01d 35/14
U.S. Cl. 210—132                 3 Claims

ABSTRACT OF THE DISCLOSURE

A filter housing having a bottom inlet and outlet, a filter surrounding the outlet, a diffuser tube extending into the outlet, a filter core forming with the outlet a restricted passage to produce an aspirating effect at the diffuser tube outlet, the filter core being carried on a bypass valve and serving to position and protect the diffuser tube.

SUMMARY OF THE INVENTION

A filter housing particularly for reservoirs having a bottom inlet and outlet. A filter surrounding the outlet and carrying a bypass valve; a filter core, at least partially perforated and carried by the bypass valve, the core extending into the outlet to reduce the area thereof; a diffuser tube extending through the bypass valve from a point adjacent the upper portion of the housing to a point within the outlet, the diffuser tube and core forming with the outlet a restricted passage providing an aspirating assistance to the action of the diffuser tube, the diffuser tube being positioned against the side wall of the core and being protected thereby when removed from the filter.

The invention relates to filtering structures and has particular relation to a filtering structure usable with a reservoir.

One purpose of the invention is to provide a reservoir filtering structure incorporating a diffuser tube and means for increasing the effectiveness thereof.

Another purpose is to provide a filtering structure incorporating a filter element bypass valve with a metal filter core carried by said valve and extending through said element and into the housing outlet for filtered fluid.

Another purpose is to provide a filtering structure having a filter element and a bypass valve therefor and a core and diffuser tube carried by said bypass valve.

Another purpose is to provide a filter bypass valve, a diffuser tube extending therethrough to a point within the filter outlet and a core carried by the valve and coterminous with the diffuser tube and within said outlet.

Other purposes will appear from time to time during the course of the specification and claims.

BRIEF DESCRIPTION OF THE DRAWING

The invention is illustrated more or less diagrammatically in the accompany drawing wherein the figure is a side view in partial cross section.

DESCRIPTION OF THE PREFERRED EMBODIMENT

The filter structure of the invention includes an elongated housing 1 having an upwardly open end 2 closed by cover 3 and seal 4. The housing 1 includes a bottom inlet 5 and a bottom outlet 6. It will be understood that the inlet 5 may be suitably connected to a lower portion of a fluid reservoir (not shown) and that a suitable conduit may be connected to the outlet 6 for transport of filtered fluid. The outlet 6 includes an upwardly extending outlet sleeve 7. A filter element 8 has an outlet axial opening carrying seal 9 for engagement with the external surface of sleeve 7. The opposite end of filter 8 receives a sleeve 10 carried by an auxiliary filter 11. A bypass valve 12 is slidable within sleeve 10 and rod 13 is secured to valve 12 and extends upwardly through filter 11 and cover 3 for actuation of a suitable indicator structure 14. The valve 12 has an internal annular flange 15 positioned to engage the sleeve 10 for prevention of the passage of fluid through the sleeve 10 under normal conditions. The flange 15 also serves to facilitate withdrawal of the bypass valve 12 and sleeve 10 with removal and withdrawal of cover 3. Similarly, the sleeve 10 has an external abutment 10a effective to engage a lower portion of a seal 10b carried by element 8 to facilitate withdrawal of the element 8 with the cover 3 and sleeve 10.

Carried by the valve 12 and extending from a point adjacent the upper area of housing 1 and filter 11 is a hollow diffuser tube 20. From its upwardly open end 21 the diffuser tube 20 extends downwardly through valve 12 to position its opposite open end 22 within the sleeve 7 and inwardly spaced a limited distance from the inner surface of sleeve 7.

A filter core 25 is secured to the inner face of valve member 12 and extends through element 8 to a point well within the outlet sleeve 7 and, as shown, coterminous with the lower end 22 of diffuser tube 20. It will be understood that diffuser tube 20 abuts the circumferential wall surface of core 25 and that core 25 may carry perforations 26.

Since a major portion of the fluid to be filtered can be expected to pass through the lower portion of filter element 8, the perforations 26 may terminate at the level shown, which has the effect also of increasing the flow of fluid through the restricted upwardly open end of sleeve 7.

Whereas there has been described and shown a preferred embodiment of the invention, it will be understood that changes may be possible therein without departing from the nature and scope thereof. The invention should, therefore, be considered in the light of its contribution to the art as disclosed herein.

The use and operation of the invention are as follows:
With the parts in place as shown in the figure, fluid entering inlet 5 from an attached reservoir (not shown) begins to fill housing 1 upwardly from inlet 5 toward cover 3. A suction mechanism (not shown) communicates through suitable conduit with outlet 6. Upon activation, fluid is drawn through inlet 5, housing 1 and element 8 to provide filtered fluid to the suction mechanism. In order to increase the head of fluid within housing 1, diffuser tube 20 provides an evacuating or suction action adjacent the upper portion of housing 1 to reduce the head of pressure therein and permit the fluid within housing 1 to reach a higher level than would otherwise be the case.

It has been found most effective to position the outlet or lower end of diffuser tube 20 at a point within the outlet of filter element 8 as shown. Further, it has been found particularly effective to provide a restriction of the filter outlet. A part of said restriction is created by the core 25 secured to bypass valve 12 and extending into the filter outlet formed by sleeve 7. The positioning of outlet end 22 of tube 20 within sleeve 7 further provides additional restriction immediately adjacent said outlet end 22, said last-named restriction being effective to create an increased flow of fluid immediately adjacent said outlet end 22 and thereby to increase the diffusing action of tube 20. In this regard the perforations 26 may be placed only in an upper portion of core 25.

Thus, upon actuation of the suction mechanism with which the filter of the invention is associated, a virtually immediate and rapid reduction in pressure at the upper portion of housing 1 results in a prompt covering of the entire element 8 by fluid drawn through inlet 5 and the continuous maintenance of a substantial head of fluid to be filtered within the housing 1 and well above element 8.

The cotermination of core 25 and diffuser tube 20 and the juxtaposition thereof serve to position diffuser 20 and to protect the same against damage when the cover 3, rod 13, valve 12, tube 20 and core 25 are removed from housing 1 and element 8.

Should the filter element 8 become clogged beyond a predetermined level, the pressure differential between the pressure within housing 1 and that at outlet 6 will cause the valve 12 to open or to move downwardly as the parts are shown against the action of a spring 14a associated with indicating mechanism 14 and rod 13. Thereupon fluid will flow through subfilter element 11, the apertures of which may be somewhat larger than those of filter element 8. Such fluid will then flow through the area within element 8 and through the sleeve 7 for delivery through outlet 6 to the pumping mechanism. Thus starvation of the mechanism requiring fluid is precluded.

The embodiments of the invention in which an exclusive property or privilege is claimed are defined as follows:

1. For use with a reservoir, a filtering housing, an inlet at the lowermost portion of said housing for communication with the reservoir, an outlet at said lowermost portion of said housing, a filter element surrounding said outlet within said housing, a hollow diffuser tube extending from a point within said outlet to a point adjacent an upper portion of said housing and above the maximum liquid level in the reservoir and said housing, a bypass valve carried by said filter element, said diffuser tube extending through said valve and being carried thereby, said filter element having a circumferential filtering wall and a circumferential perforated wall supporting said filtering wall.

2. The structure of claim 1 characterized by and including a tubular core element secured to said bypass valve and extending into said outlet, said core element having perforations positioned therein and spaced from said outlet.

3. The structure of claim 2 wherein said diffuser tube and core element abut throughout the length of said core and said core extends at least as far into said outlet as does said diffuser tube.

References Cited

UNITED STATES PATENTS

| 2,007,336 | 7/1935 | Malivert | 210—436 |
| 3,374,890 | 3/1968 | Kudlaty | 210—130 X |
| 3,384,242 | 5/1968 | Kudlaty et al. | 210—436 |

REUBEN FRIEDMAN, Primary Examiner

F. A. SPEAR, Jr., Assistant Examiner

U.S. Cl. X.R.

210—436